(12) United States Patent
Gentile et al.

(10) Patent No.: US 6,843,367 B1
(45) Date of Patent: Jan. 18, 2005

(54) ADJUSTABLE TOP GUIDE ASSEMBLY FOR AIR DRIVEN CONVEYOR

(75) Inventors: Steven S. Gentile, Toledo, OH (US); Michael J. Gladieux, Perrysburg, OH (US); Stephen L. Cechner, Sylvania, OH (US)

(73) Assignee: Dillin Engineered Systems Corp., Perrysburg, OH (US)

( * ) Notice: Subject to any disclaimer, the term of this patent is extended or adjusted under 35 U.S.C. 154(b) by 0 days.

(21) Appl. No.: 10/854,811

(22) Filed: May 27, 2004

Related U.S. Application Data
(60) Provisional application No. 60/541,467, filed on Feb. 3, 2004.

(51) Int. Cl.[7] .............................................. B65G 21/00
(52) U.S. Cl. ........................ 198/861.1; 406/86; 406/88
(58) Field of Search .......................... 198/861.1, 860.5, 198/860.3, 836.1, 836.3, 735.3; 406/88, 86

(56) References Cited

U.S. PATENT DOCUMENTS

| | | | |
|---|---|---|---|
| 3,874,497 A | | 4/1975 | Carlson |
| 4,744,702 A | * | 5/1988 | Wiseman et al. ............. 406/88 |
| 4,828,434 A | * | 5/1989 | Fairman et al. ............. 406/88 |
| 5,037,245 A | * | 8/1991 | Smith .......................... 406/88 |
| 5,129,765 A | * | 7/1992 | Smith et al. .................. 406/86 |
| 5,161,678 A | | 11/1992 | Garvey |
| 5,186,333 A | | 2/1993 | Pierson et al. |
| 5,222,840 A | * | 6/1993 | Ingraham et al. ............. 406/88 |
| 5,360,099 A | | 11/1994 | Culpepper et al. |
| 5,421,678 A | | 6/1995 | Aidlin et al. |
| 5,466,096 A | * | 11/1995 | Hilbish et al. ................ 406/84 |
| 5,517,798 A | | 5/1996 | Klopfenstein |
| 5,542,789 A | * | 8/1996 | Aidlin et al. ................. 406/88 |
| 5,551,555 A | | 9/1996 | Gladieux et al. |
| 5,570,977 A | * | 11/1996 | Simkowski et al. .......... 406/88 |
| 5,676,239 A | | 10/1997 | Mason |
| 5,682,977 A | | 11/1997 | White |
| 6,227,357 B1 | * | 5/2001 | Brown, Sr. ............. 198/861.4 |
| 6,318,935 B1 | | 11/2001 | Ouellette |
| 6,378,695 B1 | | 4/2002 | Rinne |
| 6,568,882 B2 | * | 5/2003 | Lanfranchi ................... 406/86 |

* cited by examiner

*Primary Examiner*—Richard Ridley
(74) *Attorney, Agent, or Firm*—MacMillan, Sobanski & Todd, LLC

(57) ABSTRACT

A conveyor for transporting articles includes an upper surface for transporting the articles and a top guide that is resiliently supported relative to the upper surface for preventing the articles from tipping over as they are transported. A plurality of resilient supporting mechanisms, such as gas springs, is provided on each of the opposite sides of the conveyor. A mechanism is provided to selectively move the top guide toward the upper surface of the conveyor against the urging of the gas springs to position the top guide at a predetermined distance relative to the upper surface of the conveyor. The mechanism includes a plurality of flexible cables having first ends that are connected to the top guide and second ends that are connected to a pair of actuating members that are supported on the conveyor for sliding movement. An actuator is provided for selectively effecting movement of the first and second actuating members and, therefore, positioning the top guide at a predetermined distance relative to the upper surface of the conveyor.

20 Claims, 5 Drawing Sheets

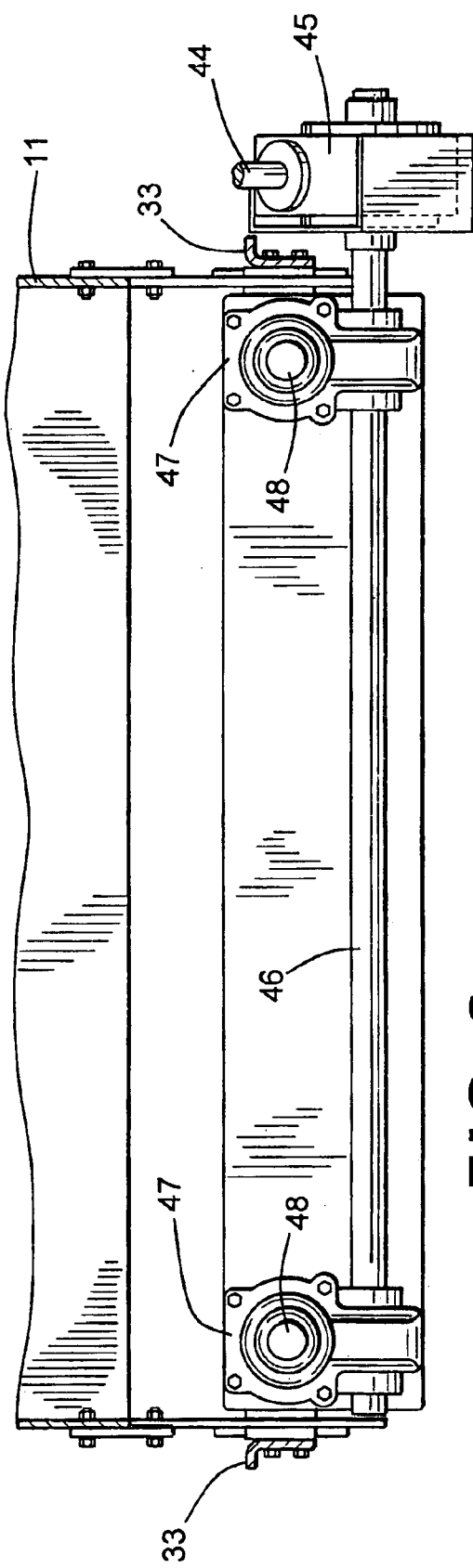
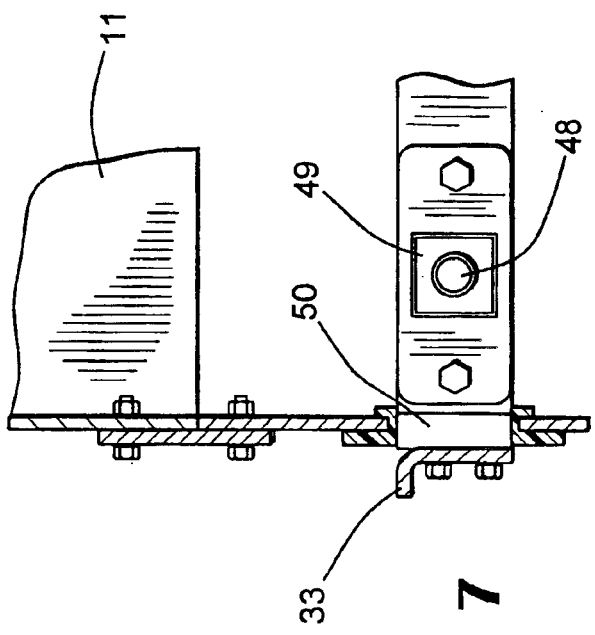
FIG. 6
FIG. 7

ADJUSTABLE TOP GUIDE ASSEMBLY FOR AIR DRIVEN CONVEYOR

CROSS REFERENCE TO RELATED APPLICATION

This application claims the benefit of U.S. Provisional Application No. 60/541,467, filed Feb. 3, 2004, the disclosure of which is incorporated herein by reference.

BACKGROUND OF THE INVENTION

This invention relates in general to conveyors for transporting packages from one location to another. In particular, this invention relates to an improved structure for supporting a top guide relative to a plenum in an air driven conveyor that allows the distance therebetween to be quickly and easily adjusted in order to readily accommodate articles of differing size.

Conveyors are well known devices that are commonly used to support and transport articles from one location to another, such as in production line situations. For example, a conveyor may be used to transport packages of a product from an upstream entry station, wherein the empty packages are introduced into the production line, to a midstream filling station, wherein the packages are filled with the product and sealed, and further to a downstream packaging station, wherein the sealed packages are packaged into larger shipping containers. Many conveyor structures are known in the art for accomplishing these basic support and transportation functions.

One known type of conveyor is an air driven conveyor. A typical air driven conveyor includes a plenum that includes an upper surface having a plurality of holes or other openings formed therethrough. The air driven conveyor further includes a fan or other apparatus for causing air to flow into the interior of the plenum. When the air flow apparatus is turned on, the pressure of the air contained within the plenum increases above the ambient air pressure outside of the plenum. As a result, pressurized air flows outwardly from the interior of the plenum through the holes formed through the upper surface thereof. Usually, the holes formed through the upper surface of the plenum are formed in such a manner that the air flowing from the interior of the plenum is directed generally in a longitudinal direction along the upper surface thereof. Accordingly, articles that are placed upon the upper surface of the plenum are slightly elevated above the upper surface by this flow of pressurized air and urged to move longitudinally along the plenum.

A typical air driven conveyor further includes a top guide for preventing the articles from rising too far above the upper surface of the plenum and, therefore, become prone to tipping over as they are moved longitudinally along the upper surface of the plenum by the flow of pressurized air. The top guide is preferably spaced apart from the upper surface of the plenum by a distance that is only slightly larger than the height of the articles, as defined by the distance between the upper and lower ends thereof. By positioning the top guide at such a distance relative to the upper surface of the plenum, longitudinal movement of the articles along the upper surface of the plenum in the manner described above is not impeded. However, if one of the articles starts to tip over, a portion of the upper end thereof will engage the lower surface of the top guide. Consequently, the articles are effectively prevented from tipping over as they are moved longitudinally along the upper surface of the plenum.

Frequently, a single air driven conveyor is used to support and transport articles having differing sizes. When the size of the articles to be supported and transported is changed, the distance between the top guide and the upper surface of the plenum must usually be changed as well. In the past, the top guide has usually been supported relative to the plenum by a plurality of mounting brackets positioned along the length of the air driven conveyor. As a result, adjustment of the distance between the top guide and the upper surface of the plenum often required that individual adjustments be made to each of the mounting brackets. This usually involved manually loosening a fastener, moving the mounting bracket to its new position, and then tightening the fastener. Such individual adjustment of each of the mounting brackets required large amounts of time and labor, resulting in a significant loss of production capacity. Thus, it would be desirable to provide an improved structure for supporting a top guide relative to a plenum in an air driven conveyor that allows the distance therebetween to be adjusted quickly and easily in order to readily accommodate articles of differing size.

SUMMARY OF THE INVENTION

This invention relates to an improved structure for supporting a top guide relative to a plenum in an air driven conveyor that allows the distance therebetween to be quickly and easily adjusted in order to readily accommodate articles of differing size. A plurality of resilient supporting mechanisms, such as gas springs, is provided on each of the opposite sides of the conveyor. A mechanism is provided to selectively move the top guide toward the upper surface of the conveyor against the urging of the gas springs to position the top guide at a predetermined distance relative to the upper surface of the conveyor. The mechanism includes a plurality of flexible cables having first ends that are connected to the top guide and second ends that are connected to a pair of actuating members that are supported on the conveyor for sliding movement. An actuator is provided for selectively effecting movement of the first and second actuating members and, therefore, positioning the top guide at a predetermined distance relative to the upper surface of the conveyor.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is an end elevational view taken along line 6—6 of FIG. 5 of the second portion of the mechanism for adjusting the position of the top guide assembly.

FIG. 7 is an end elevational view taken along line 7—7 of FIG. 5 of the second portion of the mechanism for adjusting the position of the top guide assembly.

DETAILED DESCRIPTION OF THE PREFERRED EMBODIMENT

Figure 1:
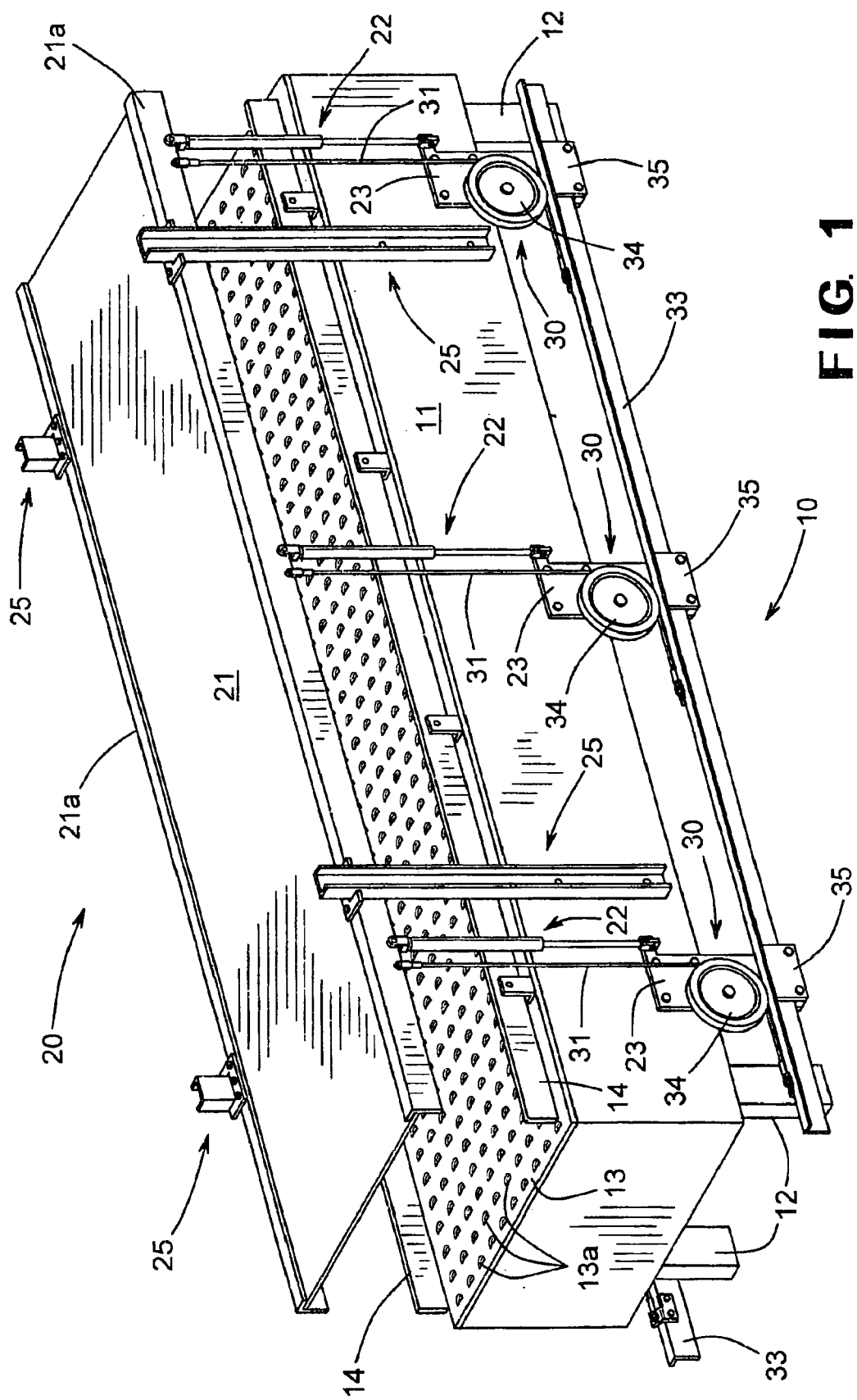
FIG. 1 is a perspective view of a portion of an air driven conveyor system including an adjustable top guide assembly in accordance with this invention.

Referring now to the drawings, there is illustrated in FIG. 1 a conveyor system, indicated generally at 10, for transporting packages from one location to another in accordance with this invention. The illustrated conveyor system 10 is an air driven conveyor system, the structure and operation of which will be explained in detail below. However, the illustrated air driven conveyor system 10 is intended merely to illustrate one environment in which this invention may be used. Thus, the scope of this invention is not intended to be limited for use with the specific structure for the air driven conveyor system 10 illustrated in the drawings or, for that matter, with conveyor systems in general. On the contrary, as will become apparent below, this invention may be used in connection with any type of conveyor system for transporting packages from one location to another or in any other desired environment for the purposes described below.

The illustrated air driven conveyor system 10 includes a plenum 11 that is supported on a plurality of legs 12. The illustrated plenum 11 is hollow and generally elongated and rectangular in shape. However, the plenum 11 can be formed having any desired shape. The plenum 11 includes an upper surface 13 having a plurality of holes 13a or other openings formed therethrough. The purpose for such holes 13a will be explained below. The air driven conveyor 11 also includes a pair of side guides 14 that are secured to the plenum 11 and extend longitudinally along the sides of the upper surface 13 thereof. The purpose for the side guides 14 will also be explained below.

As mentioned above, the illustrated air driven conveyor system 10 is designed to support and transport articles from one location to another. To accomplish this, the air driven conveyor system 10 further includes a fan (not shown) or other apparatus for causing air to flow into the interior of the plenum 11. When the air flow apparatus is turned on, the pressure of the air contained within the plenum 11 increases above the as ambient air pressure outside of the plenum 11. As a result, pressurized air flows outwardly from the interior of the plenum 11 through the holes 13a formed through the upper surface 13 thereof. In the illustrated embodiment, the holes 13a formed through the upper surface 13 of the plenum 11 are somewhat scalloped in shape and are slightly recessed. As a result, the air flowing from the interior of the plenum 11 is directed generally in a longitudinal direction along the upper surface 13 thereof. Accordingly, articles (not shown) that are placed upon the upper surface 13 of the plenum 11 are slightly elevated above the upper surface 13 by this flow of pressurized air and urged to move longitudinally therealong. The side guides 14 prevent the articles from sliding off of the opposed sides of the upper surface 13 of the plenum 11 as they are moved longitudinally by the flow of pressurized air passing through the openings 13a. The structure of the air driven conveyor 10 thus far described is conventional in the art.

The air driven conveyor system 10 further includes an adjustable top guide assembly, indicated generally at 20, for preventing the articles from tipping over as they are moved longitudinally along the upper surface 13 of the plenum 11 by the flow of pressurized air passing through the openings 13a. The illustrated adjustable top guide assembly 20 includes a top guide 21 that, in the illustrated embodiment, is generally flat and planar in shape. Preferably, the top guide 21 includes a pair of depending side portions 21a that extend longitudinally along the sides thereof, although such is not required. The side portions 21a are desirable because they can increase the stiffness of the flat planar top guide 21, thereby keeping it flat and planar in shape and allowing it to be precisely positioned in the manner described in detail below. The side portions 21a are also desirable because they facilitate selective movement of the top cover 21 relative to the plenum 11 in the manner described below. However, if desired, the top guide 21 can be provided with other mechanisms (not shown) that accomplish these same goals.

The adjustable top guide assembly 20 also includes one or more mechanisms for resiliently supporting the top guide 20 relative to the upper surface 13 of the plenum 11. In the illustrated embodiment, each of these resilient supporting mechanisms is preferably embodied as a conventional gas spring, indicated generally at 22. Preferably, the gas springs 22 are provided in laterally opposed pairs that are longitudinally spaced apart from one another along opposite sides of the plenum 11. Each of the gas springs 22 includes a cylinder portion 22a and a piston portion 22b. As is well known, each of the piston portions 22b extends within and is axially movable relative to its associated cylinder portion 22a between an extended position, wherein most of the piston portion 22b is axially extended from within the cylinder portion 22a, and a retracted position, wherein most of the piston portion 22b is axially retracted within the cylinder portion 22a. Thus, the overall axial length of each of the gas springs 22 can be varied.

Typically, the interior of the cylinder portion 22a of each of the gas springs 22 contains a quantity of a gas (such as air) or other compressible material. The gas or other compressible material contained within the interior of the cylinder portion 22a of each of the gas spring 22 is usually pressurized such that a force is normally exerted against the associated piston portion 22b. Consequently, the piston portions 22b are normally urged axially outwardly from the associated cylinder portions 22a to the extended positions relative thereto. However, by exerting a force having a greater magnitude than the force exerted by the gas or other compressed material, each of the piston portions 22b can be retracted inwardly, either partially or completely, within the associated cylinder portion 22a against the urging of the gas or other compressible material contained therein.

Figure 2:
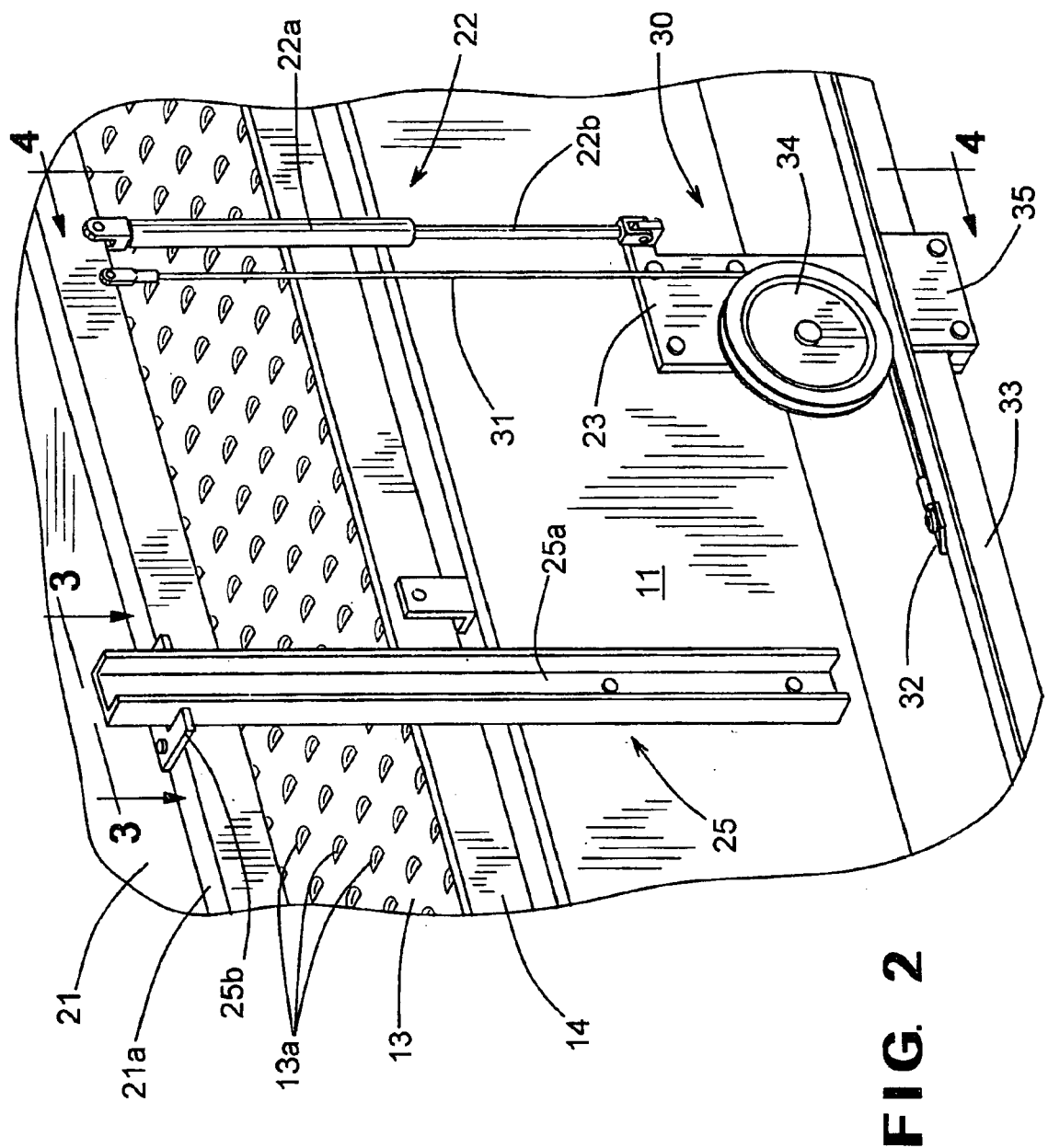
FIG. 2 is an enlarged perspective view of a portion of the air driven conveyor system illustrated in FIG. 1 showing a first portion of a mechanism for adjusting the position of the top guide assembly.
Figure 4:
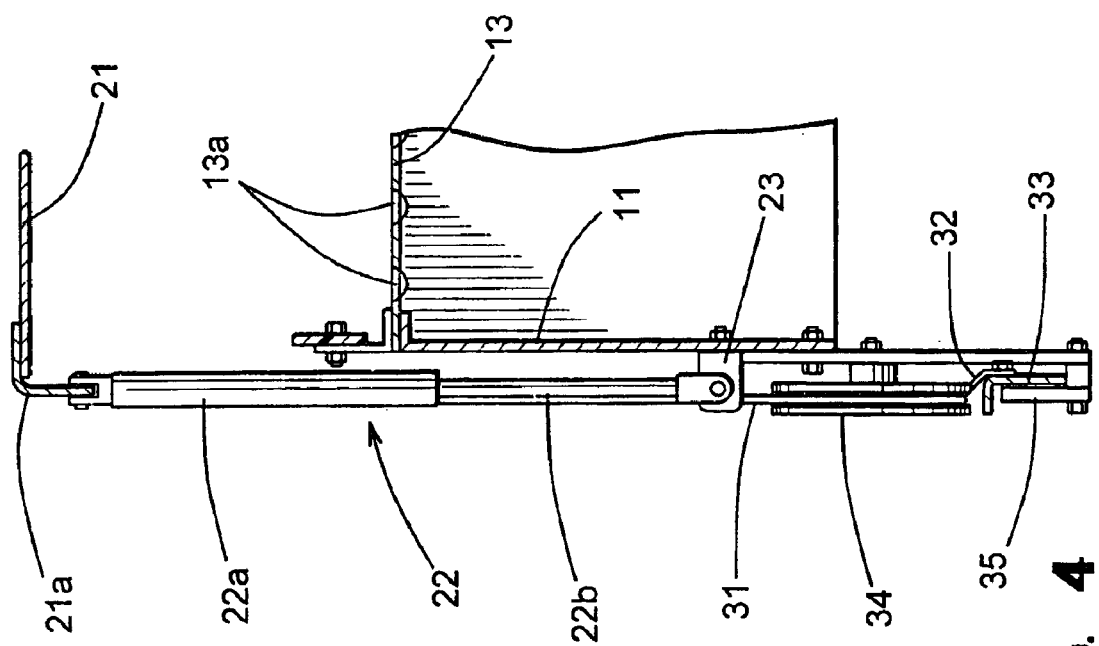
FIG. 4 is an end elevational view taken along line 44 of FIG. 2 of the first portion of the mechanism for adjusting the position of the top guide assembly.
Figure 5:
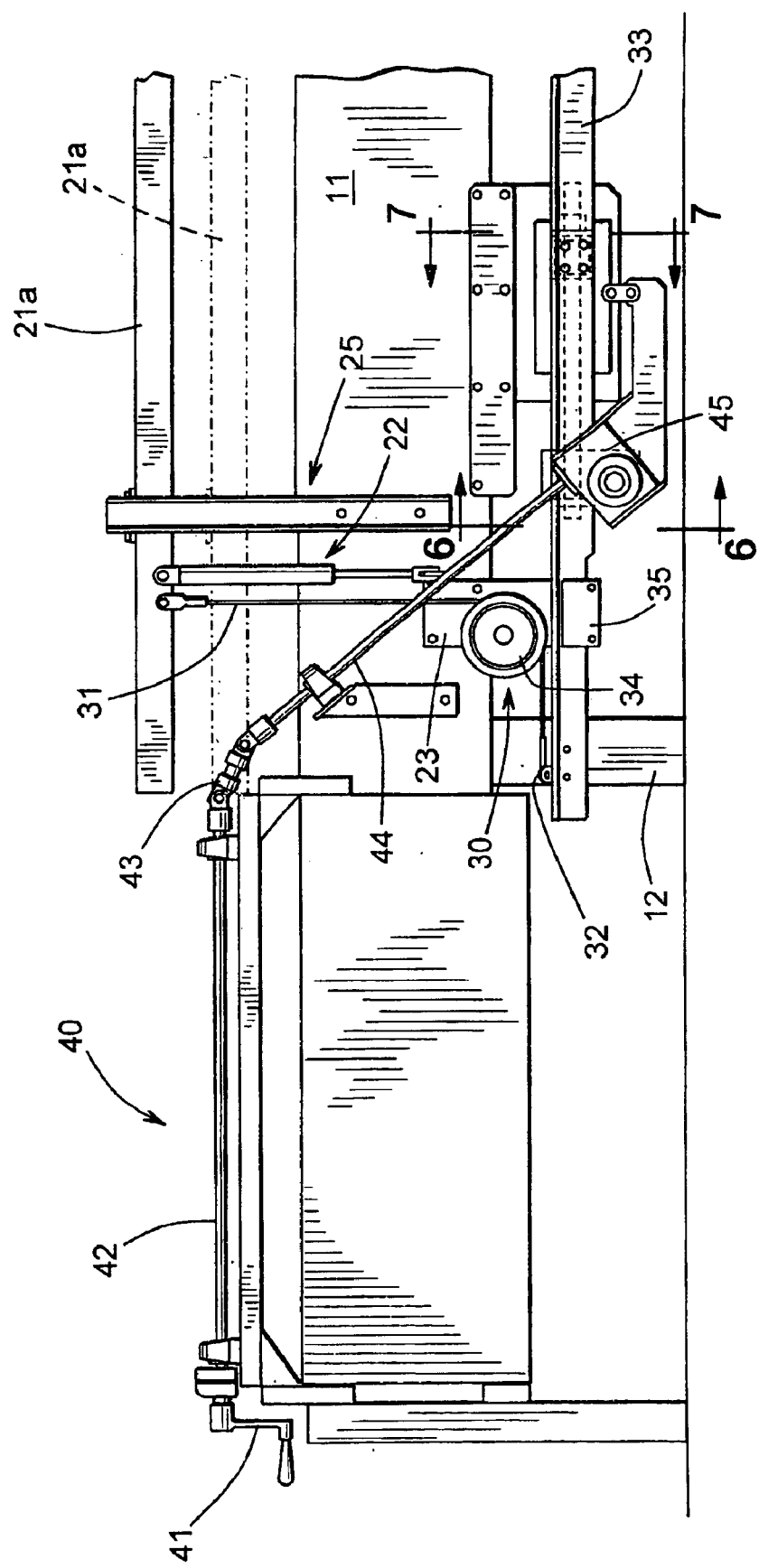
FIG. 5 is a side elevational view of a portion of the air driven conveyor system illustrated in FIG. 1 and a second portion of the mechanism for adjusting the position of the top guide assembly.

As best shown in FIGS. 2 and 4, the cylinder portions 22a of the gas springs 22 are secured to the side portions 21a associated therewith on the opposite lateral sides of the top guide 21. The piston portions 22b of the gas springs 22 are secured to respective mounting brackets 23 that, in turn, are secured to the plenum 11. Thus, the gas springs 22 function to resiliently urge the top guide 21 upwardly away from the upper surface 13 of the plenum 11, as best shown in FIG. 5. However, by exerting a force having a greater magnitude than the sum of the forces exerted by the gas or other compressed material contained within all of the gas springs 22, the top guide 21 can be moved downwardly toward the upper surface 13 of the plenum 11, as indicated by the dotted lines in FIG. 5. Accordingly, the top guide 21 is resiliently supported relative to the upper surface 13 of the plenum 11 by the gas springs 22.

Figure 3:
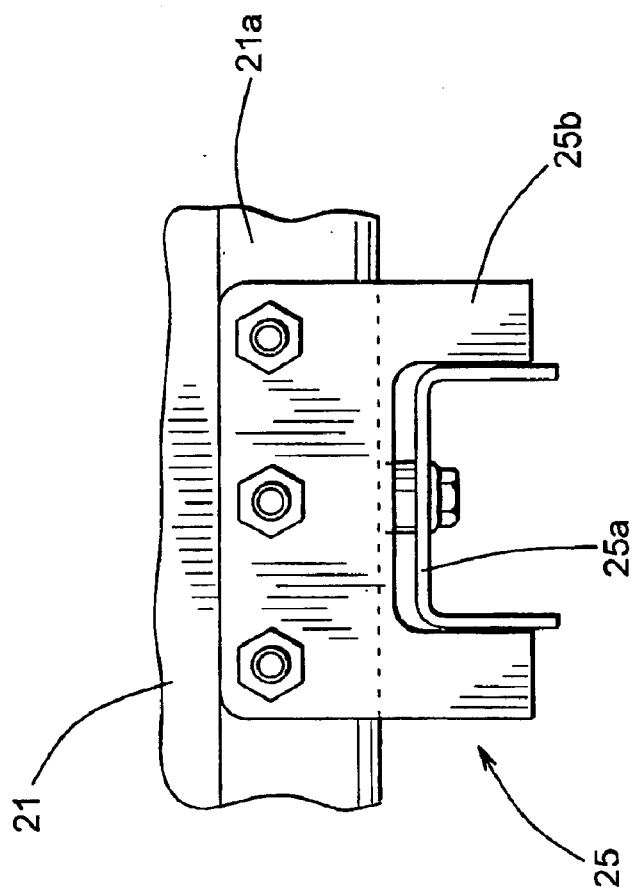
FIG. 3 is a top plan view taken along line 3—3 of FIG. 2 of a portion of the adjustable top guide assembly.

One or more support structures, each indicated at 25, are provided to guide the top guide 21 as it is moved upwardly and downwardly relative to the upper surface 13 of the plenum 11. Preferably, the support structures 25 are provided in laterally opposed pairs that are longitudinally spaced apart from one another along opposite sides of the plenum 11. As best shown in FIGS. 2 and 3, each of the illustrated support structures 25 includes a stanchion 25a and a guide member 25b. Each of the stanchions 25a is preferably embodied as a rigid, elongated, and generally U-shaped channel that is secured to the side of the plenum 11 and extends upwardly adjacent to the side portion 21a associated therewith on the opposite lateral sides of the top guide 21. Each of the guide members 25b is preferably embodied as a flat, generally U-shaped panel that is secured to the side portion 21a of the top guide 21. As best shown in FIG. 3, each of the guide members 25b defines an inner longitudinally extending distance that is slightly larger than an outer longitudinally extending distance defined by the associated stanchion 25a. Similarly, the opposed pairs of the stanchions 25a are separated by an outer laterally extending distance that is slightly larger than an inner laterally extending distance defined by the guide members 25b. Accordingly, the support structures 25 prevent the top guide 21 from moving longitudinally and laterally in a significant manner relative to the plenum 11. However, the support structures 25 freely allow the top guide 21 to move upwardly and downwardly relative to the plenum 11.

The adjustable top guide assembly 20 further includes a mechanism for positioning the top guide 21 relative to the plenum 11. In the illustrated embodiment, this top guide positioning mechanism includes a plurality of cable and pulley assemblies, each indicated generally at 30. Preferably, the cable and pulley assemblies 30 are provided in laterally opposed pairs that are longitudinally spaced apart from one another along opposite sides of the plenum 11. In the illustrated embodiment, one of the cable and pulley assemblies 30 is provided for each of the resilient support mechanisms (i.e., the gas springs 20), although such is not required.

As best shown in FIG. 2, each of the cable and pulley assemblies 30 includes a cable 31 or similar flexible member having a first end and a second end. The first ends of the cables 31 are secured to the side portions 21a of the top cover 21 on the opposite lateral sides thereof. The second ends of the cables 31 are connected through respective brackets 32 to a pair of longitudinally extending actuating members 33 that are also located on the opposite lateral sides of the plenum 11. Between the first and second ends, each of the flexible cables 31 extends about a portion of an associated pulley 34 that is rotatably supported on an associated one of the mounting brackets 23. Each of the actuating members 33 is supported for longitudinal sliding movement by a plurality of generally L-shaped bracket assemblies 35. In the illustrated embodiment, the bracket assemblies 35 are respectively secured to each of the mounting brackets 23. However, the actuating members 33 may be supported for longitudinal sliding movement in any desired manner.

The actuating members 33 are provided to selectively move the top guide 21 downwardly toward the upper surface 13 of the plenum 11 against the urging of the gas springs 22. Specifically, when the actuating members 33 are moved in a first direction (toward the left when viewing FIGS. 1, 2, and 5), the second ends of the cables 31 are pulled therewith. Because the cables 31 extend about portions of the pulleys 34, the first ends of the cables 31 are thus pulled downwardly. Such movement of the cables 31 causes a force to be exerted against the top guide 21, pulling it downwardly toward the upper surface 13 of the plenum 11 against the urging of the gas springs 22. If the sum of the forces that are exerted to longitudinally move the actuating members 33 exceeds the sum of the forces exerted by the gas or other compressed material contained within all of the gas springs 22, the top guide 21 will be moved downwardly toward the upper surface 13 of the plenum 11, as indicated by the dotted lines in FIG. 5.

Lastly, the adjustable top guide assembly 20 includes an actuator, indicated generally at 40 in FIG. 5, for selectively effecting longitudinal movement of the actuating members 33 and, therefore, for adjustably positioning the top guide 21 relative to the plenum 11. The actuator 40 may be embodied as any device that is capable of effecting such longitudinal movement of the actuating members 33. In the illustrated embodiment, however, the actuator 40 includes a hand crank 41 that is connected through a first driveshaft 42, a universal joint assembly 43, and a second driveshaft 44 to a first rotary transfer mechanism 45 (see FIG. 6). The first rotary transfer mechanism 45 is conventional in the art and includes the second driveshaft 44 as its input and a transverse driveshaft 46 as its output. The first rotary transfer mechanism 45 is adapted to translate rotational movement of the second driveshaft 44 into rotational movement of the transverse driveshaft 46. Thus, when the hand crank 41 is rotated in a first rotational direction, the first driveshaft 42, the universal joint assembly 43, the second driveshaft 44, and the transverse driveshaft 46 are all rotated in a first rotational direction, and vice versa.

The transverse driveshaft 46 is connected to second and third rotary transfer mechanisms 47 that are located on opposite sides of the plenum 11. The second and third rotary transfer mechanisms 47 are also conventional in the art, each including transverse driveshaft 46 as their inputs and having respective screw shafts 48 as their outputs. The second and third rotary transfer mechanism 47 are adapted to translate rotational movement of the transverse driveshaft 46 into rotational movement of the respective screw shafts 48. Thus, when the transverse driveshaft 46 is rotated in a first rotational direction, both of the screw shafts 48 are also rotated in a first rotational direction, and vice versa.

A nut 49 is threaded onto each of the screw shafts 48. The nuts 49 are restrained from rotating with the screw shafts 48 in any conventional manner. Thus, when the screw shafts 48 are rotated in a first rotational direction, the nuts 49 translate longitudinally along the screw shafts 48 in a first longitudinal direction. Similarly, when the screw shafts 48 are rotated in a second rotational direction, the nuts 49 translate longitudinally along the screw shafts 48 in a second longitudinal direction. As best shown in FIG. 7, the nuts 49 are respectively connected through connection members 50 to the longitudinally extending actuating members 33 that are located on the opposite lateral sides of the plenum 11. Accordingly, when the nuts 49 are moved longitudinally, the actuating member 33 are moved longitudinally therewith.

The operation of the illustrated air driven conveyor system 10 will now be described. Initially, the top guide 21 is positioned at a predetermined distance from the upper surface 13 of the plenum 11. As discussed above, this predetermined distance is preferably slightly larger than the height defined by the upper and lower ends of the articles to be supported and transported thereon. To accomplish this, the hand crank 41 is rotated by an operator so as to effect rotational movement of the first driveshaft 42, the universal joint assembly 43, the second driveshaft 44, the transverse driveshaft 46, and the two screw shafts 48. The rotational movement of the two screw shafts 48 causes the nuts 49 respectively mounted thereon to move longitudinally in a first direction (for the purpose of illustration, let it be assumed that the first direction of longitudinal movement is from right to left when viewing FIGS. 1, 2, and 5).

Consequently, the two actuating members 33 will also be moved in the first longitudinal direction (i.e., from right to left when viewing FIGS. 1, 2, and 5). As a result, the cables 31 will pull the top guide 21 downwardly toward the upper surface 13 of the plenum 11 against the urging of the gas springs 22, in the manner described above. Such movement is continued until the top guide 21 is positioned at the desired predetermined distance from the upper surface 13 of the plenum 11. Thereafter, the air flow apparatus is turned on, causing pressurized air to flow from the interior of the plenum 11 generally in a longitudinal direction along the upper surface 13. Accordingly, articles (not shown) that are placed upon the upper surface 13 of the plenum 11 are slightly elevated above the upper surface 13 by this flow of pressurized air and urged to move longitudinally therealong. When it is desired to use the air driven conveyor system to support and transport articles having a different size, the hand crank 41 is again rotated until the top guide 21 is properly positioned. Thus, it can be seen that the position of the top guide 21 relative to the upper surface 13 of the plenum 11 can be quickly and easily adjusted in order to readily accommodate articles of differing size.

Thus, it can be seen that the adjustable top guide assembly 20 is pre-loaded in the vertical direction to resiliently urge the top guide 21 upwardly away from the upper surface 13 of the plenum 11. It can also be seen that the actuating members 33 selectively move the top guide 21 downwardly toward the upper surface 13 of the plenum 11 against the urging of the gas springs 22. As a result, the structure of this invention provides an additional advantage of accurately positioning the top guide 21 relative to the upper surface 13 of the plenum 11. This occurs because the resilient urging of the gas springs 22 takes up any looseness or play between the mechanical components of the adjustable top guide assembly 20. Consequently, the top guide 21 can be positioned more quickly and accurately relative to the upper surface 13 of the plenum 11 than known mechanical adjustment structures.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A conveyor for transporting articles comprising:
   a conveyor including an upper surface for transporting articles;
   a top guide that is located above articles being transported on the upper surface and is supported for resilient displacement relative to said upper surface of said conveyor; and
   a member secured to the top guide for displacing the top guide in opposition to the resilient displacement support.

2. The conveyor defined in claim 1 further including a resilient supporting mechanism that extends between said conveyor and said top guide for resiliently supporting said top guide relative to said upper surface of said conveyor.

3. The conveyor defined in claim 2 wherein said resilient supporting mechanism is a gas spring.

4. The conveyor defined in claim 1 further including a mechanism for actuating the member and positioning said top guide at a predetermined distance relative to said upper surface of said conveyor.

5. The conveyor defined in claim 4 wherein said mechanism for positioning said top guide includes the member including a first end that is connected to said top guide and a second end that is connected to an actuating member such that movement of said actuating member causes movement of said top guide.

6. The conveyor defined in claim 5 wherein said member is a flexible cable.

7. The conveyor defined in claim 5 wherein said actuating member is supported on said conveyor for sliding movement.

8. The conveyor defined in claim 5 wherein said member is a flexible cable and wherein said actuating member is supported on said conveyor for sliding movement.

9. The conveyor defined in claim 8 wherein said flexible cable extends about a portion of a pulley.

10. The conveyor defined in claim 5 wherein said mechanism for positioning said top guide further includes an actuator for selectively effecting movement of said actuating member.

11. The conveyor defined in claim 1 further including a plurality of resilient supporting mechanisms that extend between said conveyor and said top guide for resiliently supporting said top guide relative to said upper surface of said conveyor.

12. The conveyor defined in claim 11 wherein said resilient supporting mechanisms are provided in laterally opposed pairs that are longitudinally spaced apart from one another along opposite sides of said conveyor.

13. The conveyor defined in claim 11 wherein each of said resilient supporting mechanisms is a gas spring.

14. The conveyor defined in claim 11 further including a mechanism for positioning said top guide at a predetermined distance relative to said upper surface of said conveyor.

15. The conveyor defined in claim 14 wherein said mechanism for positioning said top guide includes first and second members that are provided on opposite sides of said conveyor and first and second actuating members that are provided on opposite sides of said conveyor, said first member having a first end that is connected to said top guide and a second end that is connected to said first actuating member, said second member having a first end that is connected to said top guide and a second end that is connected to said second actuating member, whereby movement of said first and second actuating members causes movement of said top guide.

16. The conveyor defined in claim 15 wherein each of said first and second members is a flexible cable.

17. The conveyor defined in claim 15 wherein each of said first and second actuating members is supported on said conveyor for sliding movement.

18. The conveyor defined in claim 15 wherein each of said first and second members is a flexible cable and wherein each of said first and second actuating member is supported on said conveyor for sliding movement.

19. The conveyor defined in claim 18 wherein each of said flexible cables extends about a portion of a pulley.

20. The conveyor defined in claim 15 wherein said mechanism for positioning said top guide further includes an actuator for selectively effecting movement of said first and second actuating members.

* * * * *